Patented July 7, 1925.

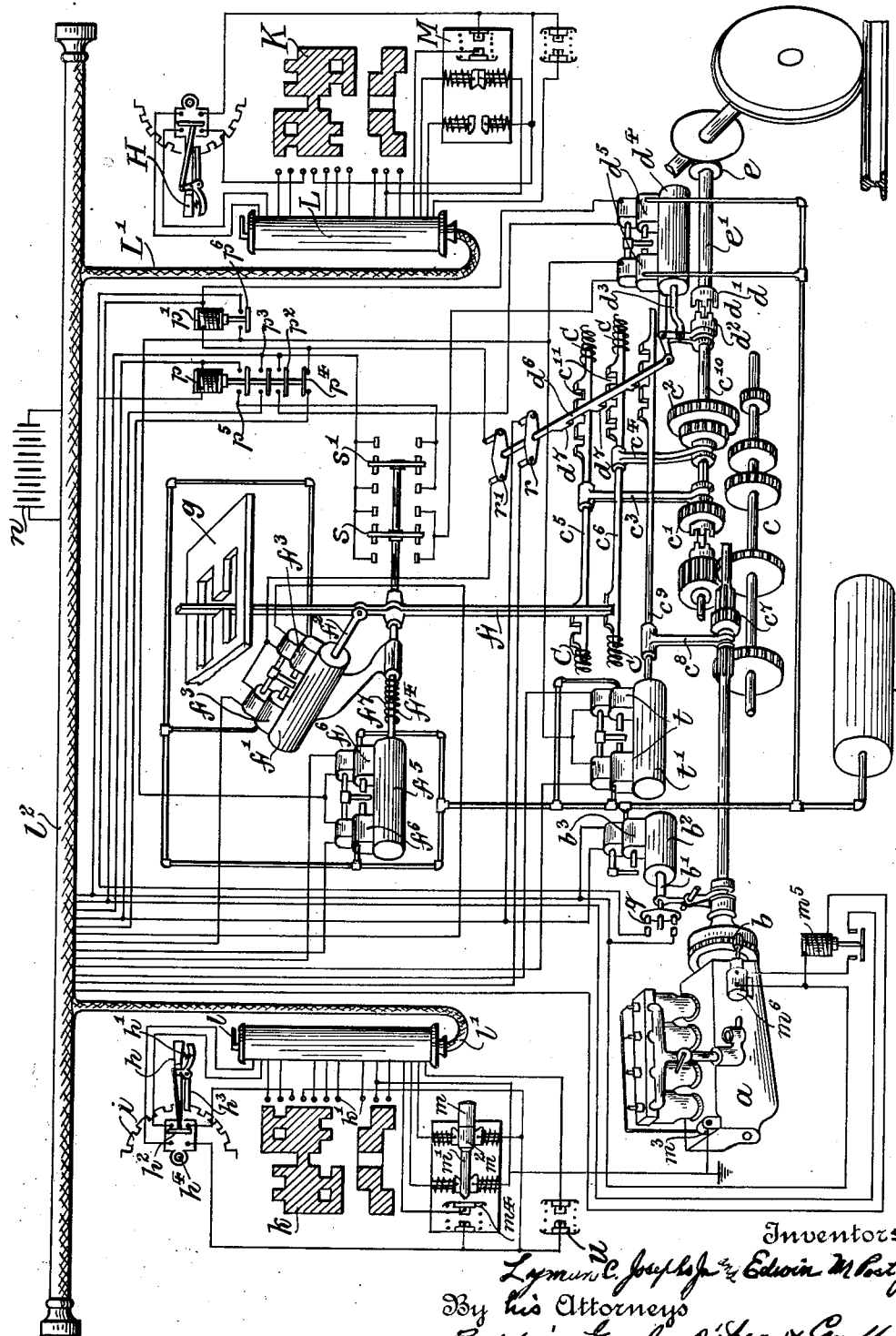

1,544,909

UNITED STATES PATENT OFFICE.

LYMAN C. JOSEPHS, JR., OF ALLENTOWN, PENNSYLVANIA, AND EDWIN M. POST, JR., OF NEW YORK, N. Y., ASSIGNORS TO INTERNATIONAL MOTOR COMPANY, OF NEW YORK, N. Y., A CORPORATION OF DELAWARE.

CONTROL SYSTEM FOR VEHICLES PROPELLED BY INTERNAL-COMBUSTION ENGINES.

Application filed July 14, 1923. Serial No. 651,649.

*To all whom it may concern:*

Be it known that we, LYMAN C. JOSEPHS, Jr., and EDWIN M. POST, Jr., citizens of the United States, residing, respectively, at Allentown, in the State of Pennsylvania, and in the borough of Manhattan of the city of New York, in the State of New York, have invented certain new and useful Improvements in Control Systems for Vehicles Propelled by Internal-Combustion Engines, of which the following is a specification, reference being had to the accompanying drawing, forming a part hereof.

This invention relates to control systems for vehicles propelled by internal combustion engines and is designed primarily with reference to its application to rail cars having a clutch and change speed transmission interposed between the motor and final drive. More particularly, the invention is concerned with the provision of means under the control of the operator for establishing in certain electrical circuits conditions which will bring about automatically initiation of operation under independent power means, of the clutch or clutches and change speed elements in proper sequence and prevent initiation of operation of any one element out of such proper sequence. To this general end the system provides either in conjunction or separately, electrical interlock means movable, respectively, with the actuated mechanical elements, to establish the proper electrical conditions in the system for the next succeeding operation, and mechanical interlock means movable with certain of the actuated mechanical elements, to establish the proper mechanical conditions in the system for the next succeeding operation.

Systems intended to accomplish to some degree the results sought for herein have been proposed but do not meet the present day requirements of complete automatic control by a comparatively unskilled operator. Nor have they embodied in a single system means for functioning invariably and sequentially upon manipulation of a single control element, without separate and additional manual manipulations by the operator.

In accordance with the present invention there are brought into such a system both a new principle of control and a new combination of mechanical units to insure the safest possible operating conditions and the greatest facility of speed controls in both forward and reverse directions.

The control system, generally, comprises electromagnetically operated switches for closing selected circuits successively for establishing at the proper times operating conditions in such circuits, electromagnetically operated control members in such circuits for initiating delivery of power to the mechanical unit to be actuated, and switches moved with certain of said mechanical units to thereupon establish in certain other circuits proper electrical conditions for operation of the electromagnetically operated members in such other circuits for initiating delivery of power to the mechanical unit next to be actuated, and so on, sequentially. The operator's selection in bringing about such working conditions is limited to the simplest and most obvious manipulations of an electrical control and beyond these his volition is not involved.

In the preferred embodiment a mechanical interlock is provided, in addition, for the change speed gears or their shifter rods, which interlock may be movable in predetermined relation to a clutch for maintaining safe relations at all times between the gears and the clutch. In some cases, the last named interlock is provided in conjunction with what is herein termed an isolator clutch, that is, a clutch separate from the master control clutch, which is interposed between the change speed gears and the final drive. The improvements provide for the movement of this clutch in predetermined relation to the master clutch and to the gears and the mechanical interlock is preferably connected operatively with the power actuating means for the isolator clutch so as to be movable thereby. Advantage is taken of such a construction to provide switch elements movable with such a mechanical interlock for establishing proper operating conditions in certain of the electrical circuits at proper times, in the manner indicated hereinbefore.

From the statement of invention made above it will be understood that the invention, in its broader aspects, is not to be limited to the character of the power means for actuating the various mechanical units but there has been illustrated herein, pneumatic devices for this purpose which have been found to lend themselves admirably to the conditions to be met in rail car practice and to satisfy manufacturing and service conditions in simplicity, cheapness, accessibility, responsiveness and smooth application of power. The invention is not concerned with the details of construction of such pneumatic devices but in view of the advantages which they present in a system of electrical control characterized by the novel features to be described, some of the claims will cover combinations of elements constituting an electropneumatic control system.

Other particular objects of the invention will now be indicated briefly. One of the most important of these is to provide in an electric control system switch elements actuated by electromagnets which are so interwired as to insure invariably, and regardless of the condition of the mechanical units, first, a shifting of the gears to neutral, before initiation of any subsequent operation, and second, initiation of any such subsequent operation only upon the completion of the manipulation of the controller by the operator.

Still another object of the invention is to provide a control system by which operation of the master clutch may be initiated without initiating operation of any of the other mechanical units.

A further object is to provide in such a car, controller means at opposite ends thereof which may be cut in or out as desired, and may be used as needed to effect the control described.

These and other objects will appear more particularly hereinafter in connection with the detail description of the embodiment illustrated schematically and conventionally in the drawings, by way of example.

As this description proceeds it will be evident to one skilled in the art that the form and design of the devices employed in the practice of the system and wiring thereof may be changed to suit conditions although the schematic arrangement shown in the accompanying drawing is complete and operative for the intended purpose. It is unnecessary in this application to describe in detail the wiring employed since that forms no part of the present invention except in so far as the interconnection of certain of the units is expressly indicated. While one of the objects of the invention is to incorporate in the improved system a double-ended control, a single control at one end of the car only will be described in connection with its relation to the controlled units and, thereafter the means for incorporating in the system a second control disposed in some other location on the car and operative, when required, to effect initiation of operation of the units in a similar manner, will be pointed out.

For the purpose of this description there is indicated generally a propelling motor $a$, a master clutch $b$, transmission gearing $c$, and as a desirable but not essential element what will be hereinafter termed an isolator clutch $d$ interposed operatively between the transmission and the final drive pinion $e$. The transmission gearing, which may be of any suitable construction, is illustrated as having slidable gears $c'$, $c^2$, engaged operatively by forks $c^3$, $c^4$, secured to shifter rods $c^5$, $c^6$, respectively. Since it may be desirable, particularly in rail car constructions, to provide for as many speeds in reverse as in forward (in this case, four in number) a sliding gear $c^7$ is shown as interposed operatively between the clutch $b$ and the change speed gears of the set to provide selectively for forward and reverse speeds under the influence of a fork $c^8$ secured to a shifter rod $c^9$. The shifter rod $c^5$, $c^6$, may be engaged selectively by means of a gear shifting lever $f$ the lower end of which may be swung transversely to pick up one or the other of the rods for longitudinal movement in the conventional manner, the upper end of the lever projecting through an H-plate $g$ of usual form.

The isolator clutch $d$ may take any one of many forms but is shown as comprising an element $d'$ secured to the propeller shaft $e'$ and having teeth engageable by the teeth of a jaw clutch element $d^2$ feathered on the main transmission shaft $c^{10}$. As the description proceeds it will be evident that if the isolator clutch be omitted power nevertheless may be transmitted to the propeller shaft from the transmission in the accustomed manner.

The present improvements have to do generally, in a self-propelled vehicle having the units hereinbefore described, or their equivalent, with devices for actuating said units selectively, or in desired sequence, by remote control means under the influence of an operator at some predetermined part of the vehicle. In a rail car propelled by an internal combustion engine, in which the improvements will find their greatest usefulness, it is proposed to provide an electric controller movable by an operator into different positions for initiating operation of electrical devices which will, in turn, bring into play pneumatic means for moving the said units. Such a controller handle of suitable form is shown conventionally at $h$ and has connected thereto a pivoted hand-grip $h'$, a switch member $h^2$ and a retaining latch $h^3$ movable over a quadrant $i$ and engageable therewith, as desired. Rotation of the controller handle $h$ about its axis $h^4$, in one direction, will serve to control movements of the various units when the car is traveling in a forward direction, while rotation contrariwise, will serve to control such units when the car is traveling in a reverse direction. A controller drum which is shown in developed plan at $k$ is movable under the influence of the controller handle $h$ for controlling selected circuits $k'$ in different angular positions in a manner which will be understood. All of the circuits controlled by the means described are completed through a cut-out switch, the operating handle for which is shown at $l$ and are completed through wires leading from the cut-out switch and shown as encased in a cable $l'$ through which they pass into the main car cable $l^2$ and are led therefrom, as required, to the respective controlling elements for the units to be actuated.

*Control for starting the motor.*

An electric starting motor of conventional type is used to start the internal combustion engine of the rail car. However, in order to set the engine in motion it is necessary not only to supply electric current for the starting motor but also so arrange the circuit from the magneto so that it may function. Both of these conditions are accomplished by means of a switch $m$ of suitable design. This switch element may have two portions, one of which $m'$ is a non-conductor of electricity and the other one of which $m^2$ is a conductor of electricity. That portion which is a non-conductor separates two elements of the switch and thus breaks a ground connection from the magneto $m^3$ which makes the magneto operable. At the same time the conducting portion $m^2$ of the plug $m$ makes a contact between two elements of the switch which closes a circuit supplying electricity from a storage battery $n$ or other source of current supply to the control units of the car. A third circuit is closed by pressing the plug $m$ beyond its normal position and against the spring-pressed terminal $m^4$ which closes the circuit of a remote control switch $m^5$ for the starting motor $m^6$. When the plug is so pressed current is admitted to the electromagnetic switch $m^5$ which in turn admits current to the electric starting motor. When the starting motor functions the gasoline motor is cranked and because the magneto is no longer grounded the gasoline motor is started.

*Electro-pneumatic devices for actuating the units to be controlled.*

The main clutch $b$ is disengaged by means of a piston $b'$ in the air cylinder $b^2$ whenever air is admitted to the cylinder. The admission of air to the cylinder is controlled by an electric-pneumatic operable valve $b^3$. When this valve is opened air is admitted to the cylinder from the main air pressure tank. When contact is cut off from the electro-pneumatic valve a spring returns it to the closed position, this shuts off the air from the pressure tank and opens an exhaust port in the cylinder $b^2$ which may be restricted so as to insure the slow and gradual return of the piston to its normal position in a manner well known. The piston $b'$ is returned by the actions of the clutch spring which also serves to re-engage the main clutch.

The isolator clutch $d^2$ is operated by a piston $d^3$ contained in a cylinder $d^4$ so designed that air may be admitted to either side of the piston. Air being admitted to one side of the piston by energizing an electro-pneumatic valve $d^5$ disengages the isolator clutch and air being admitted to the other side of the piston by a second electro-pneumatic valve $d^5$ engages the isolator clutch.

The shifter rods $c^5$, $c^6$, which control the four possible gear shifts are engaged by balancing springs C so arranged as to tend to hold the gears in their neutral position. When it is desired to engage one of these gears its shifter rod is actuated through the lever $f$ and when in position is held in position against the pressure of the balancing springs by a mechanical interlock rod $d^6$ connected to the isolator clutch $d^2$. The rod $d^6$ has fingers $d^7$ which when the rod is retracted enter slots $c^{11}$ then aligned in the three rods $c^5$, $c^6$, $c^9$, thereby positively locking the shifted rod against its spring until the interlock rod $d^6$ is subsequently slid out of engagement with all of the rods. This relation makes it impossible for any gears to be engaged unless the isolator clutch $d^2$ is in the disengaged position. It is also impossible once any gears are in mesh and the jaw parts $d'$, $d^2$, engaged for the shifted gear to return to its neutral position until the isolator clutch is disengaged at which time the balancing springs return the gear to its neutral position. In any case where the isolator clutch is omitted it will be clear to one skilled in the art that the action of the interlock rod $d^6$ remains unaffected.

The lever $f$ is made to engage with either the shifter rod $c^5$ or $c^6$ by means of a double-acting pneumatic cylinder $f'$ and piston $f^2$ controlled by two electromagnetic valves $f^3$. When engaged with either the shifter rod $c^5$ or $c^6$ the lever $f$ permits the shifter rod to be slid so as to engage the controlled gears in either of the two selective speeds which such gears are capable of producing. The piston for imparting the longitudinal movement is shown at $f^4$ and operates within a cylinder $f^5$ controlled by electromagnetically operated valves $f^6$. A centering spring $f^7$ co-operates with the piston rod $f^4$ and yieldingly opposes such sliding movements.

Remote control switches and interlock switches.

Two remote control switches $p$, $p'$, are incorporated in the system which for convenience of terminology will be hereafter called, respectively, a neutralizing relay and an application relay. One of the functions of the neutralizing relay $p$ which will first be described is to close certain circuits when it has been energized itself from the manual control, which circuits initiate operation of the clutch, and also of the isolator clutch allowing gears to be returned to neutral. The application relay $p'$ cannot be energized before the function governed by the neutralizing relay $p$ have been completed. When the switch $p'$ is energized it closes certain circuits which permit the energizing of certain electro-pneumatic valves which in turn cause air to be admitted to the cylinders engaging the gears in whatever speed has been predetermined by the hand-control and, after the required speed gear change has been effected, allows electric current to energize the electro-pneumatic valve $d^5$ which controls the re-engaging of the isolator clutch $d^2$ which upon closing cuts off the current which has been energizing the electromagnetic valve $b^3$ controlling the clutch cylinder $b^2$ and thus allowing the clutch $b$ to re-engage.

In order to assure a proper sequence for the operations of disengaging the main clutch and the isolator clutch and also the meshing or unmeshing of the gears of the transmission it was found advisable to incorporate in the system interlocking switches which control the circuits above-mentioned. One of these switches $q$ is operated mechanically by the piston rod clutch $b'$ in such manner that its circuit is closed only when the clutch is disengaged. The switch $q$ when the clutch is disengaged closes a circuit which passes through the remote control switch contact $p^2$ and energizes the electromagnetically controlled valve $d^5$ which admits air for the disengaging of the isolator clutch $d^2$. It is impossible for the isolator clutch to be disengaged by any other circuit thus insuring against the isolator clutch $b$ being disengaged unless the main clutch is itself first disengaged. Switches $r$, $r'$, are operated mechanically by the isolator clutch piston rod $d^3$ being, for convenience carried on the locking bar $d^6$ above described. As an additional precaution to prevent the possibility of the main clutch $b$ re-engaging during the time the isolator clutch $d^2$ is itself in the process of disengaging the clutch is thrown out by operation of the remote control switch contact $p^3$ which energizes the electromagnetic valve $b^3$ admitting the air to the clutch cylinder $b^2$ as long as the neutralizing relay $p$ is itself energized. The switch $r$ closes a circuit when the isolator $d^2$ is disengaged which circuit energizes the main clutch electro-pneumatic valve $b^3$ thus maintaining air in the clutch cylinder $b^2$ and assuring that the clutch will remain disengaged as long as the isolator clutch is itself disengaged. The interlock switch $r'$ is also closed when the isolator $d^2$ is disengaged closing a circuit through the remote control switch contact $p^4$ and energizing whichever one of the electromagnetic valves $f^3$ may have been previously selected by the hand-control. Valves $f^3$ admit air to the cylinder $f'$ which determines whether the lever $f$ is engaged with the gear shift rod $c^5$ or $c^6$. Switches $s$, $s'$, are connected to the shift rod $f^4$ and are so arranged that they are both open when the lever $f$ is in the neutral position, (which is whenever the gears are in neutral position) but both switches $s$, $s'$, are closed when the lever $f$ is in either of the engaged positions (which is whenever any gears are in mesh). The switch $s'$ closes a circuit through remote control switch contact $p^5$ energizing the neutralizing relay $p$ whenever any gear is not in neutral. Switch $s$ closes a circuit through the remote control switch contact $p^6$ which energizes the electro-pneumatic valve $d^5$ which serves to engage the isolator clutch $d^2$.

Relation between controller switch and remote control switches.

The contact switch $h^2$, when projected by depression of the grip $h'$, makes a circuit which energizes the neutralizing relay $p$ thus closing the remote switch contacts $p^2$, $p^3$, and $p^5$. When the grip $h'$ is released, and if the gears are in neutral, this circuit is broken and the switches $p^2$, $p^3$ and $p^5$ are opened but switch $p^4$ is then closed. The switch $h^2$ with the grip $h'$ released makes a circuit through remote control switch contact $p^4$ which is then divided and passes through switch $r'$ to energize the appropriate electromagnetic valves $f^3$. The second branch of this circuit passes through interlocking switch $q$ and energizes the application relay $p'$ thus closing remote control switch contact $p^6$.

Typical operation of the control system.

Assuming that the motor has been started through the starting control in accordance with the description of the manipulation of the starting plug $m$ hereinbefore given and that the controller handle $h$ is in its median position, it may be assumed that the car is at rest, at which time the master clutch $b$ and the isolator clutch $d$ may both be engaged and the gears in neutral. The operator will first depress the grip $h'$ which immediately makes a contact by means of switch $h^2$ energizing the neutralizing relay $p$ and thereby closing the remote control switch contacts $p^2$, $p^3$ and $p^5$. The switch $p^5$ closes a circuit energizing the electro-pneumatic valve $b^8$ which disengages the main clutch $b$. The disengaging of the main clutch closes the switch $q$ which admits current to the isolator clutch valve magnet $d^5$ admitting air to the cylinder $d^4$. The isolator clutch then disengages closing switches $r$, $r'$. The switch $r$ then makes a circuit assuring the continued disengagement of the main clutch $b$. The handle $h$ in the meantime has been rotated to a predetermined position on the quadrant $i$ and the grip $h'$ released breaking the circuit to the neutralizing relay $p$ previously made and making the circuit through remote switch contact $p^4$, and whichever one of the electromagnetic valves $f^3$ has been previously selected through the angular position of the drum $k$ denoting a predetermined speed and insuring the selection of the proper gear through one of the circuits $k'$. This circuit through $p^4$ also passes through the switch $q$ and energizes the application relay $p'$. The application relay closes the switch $p^6$ which allows current to pass to the selected circuit of the electro-pneumatic valves $f^6$ for shifting the selected shifter rod $c^4$, $c^5$, longitudinally.

During these sequential events the main clutch has been held in a disengaged position through the switch $r$, the switch $r$ has been held closed because the isolator clutch $d^2$ has been in a disengaged position and the bar $d^6$ held with the fingers $d^7$ out of the slots $c^{11}$. As soon as the selected gear has been meshed the switch $s$ closes a circuit which actuates the electro-pneumatic valve $d^5$ to cause re-engagement of the isolator clutch $d^2$ and, simultaneously, movement of the locking bar $d^6$ into mechanical locking engagement with the shifter rod which has been shifted. The re-engaging of the isolator $d^2$ opens the switch $r$ allowing the main clutch $b$ to close by breaking the circuit of the magnet $b^8$. It also opens switch $r'$ breaking the circuit to the magnetic valves $f^3$. The shifted rod $c^5$, $c^6$, is then held against the action of the springs by the engagement of the bar $d^6$ with it. The closing of the clutch $b$ opens the switch $q$ breaking the circuit in the application relay $p'$ and resulting in the car being propelled at a speed determined by the selected gear, clutches $b$ and $d$ engaged, and all circuits open. With one gear thus engaged the controller handle $h$ may be rotated with the drum $k$ to close the circuit of any other gear selected. In accomplishing this operation the grip $h'$ is again first depressed energizing the neutralizing relay $p$ through the contact $h^2$ and when the drum has been revolved to select the desired circuit of the desired speed gear, the grip is released and the sequential operations heretofore described, follow in order.

The switches $p^2$, $p^3$, $p^5$ are closed. The switch $p^5$ closes the circuit of the electro-magnetically operated valve $b^3$ and brings about disengagement of the main clutch $b$. The switch $p^5$ closes the circuit through the switch $s'$ assuring the continued energization of the neutralizing relay $p$ even though the grip $h'$ should be released too soon. The switch $p^2$ closes the circuit through the switch $q$ to the isolator control $d^5$ thereby causing opening of the isolator jaw $d^2$. Simultaneously, the bar $d^6$ is moved to close the interlock switch $r$ which insures the continued disengagement of the main clutch $b$. The switch $r'$ is also closed to energize the selected magnet $f^3$ for the transverse movement of the selector lever $f$. The grip $h'$ meanwhile having been released the neutralizing relay $p$ has its circuit broken by reason of movement of the switch $s$ in the neutral position. The return of the shifter rod to neutral is effected by the centralizing spring acting through the lever $f$. Whereupon the the remote control switch $p'$ is automatically closed and completes the circuit to the previously selected cross shift $f^3$ and also completes a circuit through the contact $p^6$. Switch $p^6$ completes a circuit through the previously selected longitudinally shifting magnet control $f^6$. With any of the gears meshed if the handle $h$ is moved back to median position the depression of the latch $h'$ will through the operation of the switch $h^2$ throw all of the parts into neutral position as heretofore described in connection with the selection of any speed and when the drum $k$ assumes its neutral position the circuit through the switch $r$ which normally holds the main clutch disengaged is broken on the drum $k$, (this circuit would not be broken in this manner with the drum $k$ in any other position than in the neutral position). This circuit through switch $r$ when broken breaks the circuit of neutralizing relay $p$. The contact $p^3$ is consequently open and the main clutch $b$ is permitted to drop in under the action of its spring.

The movements described herein are duplicated with respect to travel of the vehicle in the opposite direction upon movement of the lever $f$ with the drum on the opposite side of the quadrant. When the drum is rotated in the contrary direction from its median position it will always maintain the circuit closed for the electro-magnetically operated valve $t$ by which the air is admitted to a cylinder $t'$ for actuating the rod $c^9$ to shift the reverse gear $c^7$. Accordingly, even though the described actions follow in the sequence noted for the initiation of operation of the master clutch, isolator clutch and selected speed gear, when the car is traveling in a reverse direction, the reverse gear $c^7$ is held in mesh to change the direction of drive ahead of the change speed gears. This condition is obtained by a suitable development of the controller drum $k$ in a manner which will be understood by one skilled in the art.

A further feature of the invention resides in the connection of the various circuits to a duplicate controller disposed at some other part of the car, to the end that an operator may be located conveniently regardless of the direction of travel. In accomplishing this, double wires are led from the car cable $l^2$ through the branch lead L' into another cut out switch L by which a duplicate controller H, drum K, and starting switch may be connected in or cut out as required. In a co-pending application filed by the present applicant on September 5, 1923, Serial No. 661,001 there is shown and described the application of this control system to serve physically connected vehicles some of which carry power units and all of which carry control units for the power units, to the end that initiation of the controlled units may be accomplished from any one of the said vehicles. Accordingly, this construction forms no part of the present invention.

The description has brought out the fact that the master clutch $b$ is never disengaged except when the isolator clutch $d$ is also to be disengaged. This condition is accomplished by the interlock system described. However, it will be recognized that under some conditions of operations, as for instance when it is desired to permit the car to coast without disturbing the gear relation to disengage the clutch and re-engage it when needed without manipulating the isolator clutch or its associated units. Accordingly, a supplemental manually operable switch $u$ is connected in parallel with the circuit for the eletromagnetic valve $b^3$, but not through any of the remote control switches or interlock switches described. By closing the switch $u$ manually it thereby becomes possible to operate an electromagnetically controlled valve $b^3$ and admit air to the cylinder $b^2$ for throwing the clutch for as long a period as desired, The breadth of the invention appears from the preamble to the specification and its scope from the appended claims so that no further indication of the permissible variations and the design seem required.

What we claim is:

1. In a vehicle, in combination with an internal combustion motor, clutch and change speed transmission, a control system therefor including power means for actuating the clutch and transmission, electromagnets for initiating operation of such power means, electromagnetically operated switches for closing the circuits of certain of said first named electromagnets, switches movable upon operation of the power means for closing the circuits of certain other of said first named electromagnets, and controlling means operable manually for initiating operation of the control system.

2. In a vehicle, in combination with an internal combustion motor, clutch and change speed transmission, a control system therefor including separate power devices for actuating the clutch and transmission, respectively, electromagnets for initiating operation of such power devices, electromagnetically operated switches for closing the circuit of the electromagnet for the clutch, a switch movable with the power devices for actuating the gears to control the condition of the circuit to the electromagnet for the clutch, and controlling means operable manually for initiating operation of the control system.

3. In a vehicle in combination with an internal combustion motor, change speed gears, a control system therefor including power means for actuating the gears, electromagnets for initiating operation of such power means, switches movable upon operation of the power means for closing the circuits of certain of said electro-magnets, controlling means operable manually for effecting the closing of the circuits of certain others of said electro-magnets, and a mechanical interlock for the gears.

4. In a vehicle, in combination with an internal combustion motor, change speed gears, and final drive, a clutch interposed between the gears and the final drive, a control system therefor including power means for actuating the clutch and gears, electromagnets for initiating operation of such power means, switches movable upon operation of the power means for closing the circuits of certain of said electro-magnets, controlling means operable manually for effecting the closing of the circuits of certain others of said electromagnets, and a mechanical interlock for the gears movably with the clutch and with certain of said switches.

5. In a vehicle, in combination with an internal combustion motor, a master clutch, change speed transmission and isolator clutch between the gears and the final drive, a control system therefor including power means for actuating the clutches and transmission, respectively, electrical means for initiating operation of said power means, and switches movable upon operation of the power means for the isolator clutch for controlling the circuit of said master clutch.

6. In a vehicle, in combination with an internal combustion motor, a master clutch, change speed transmission and isolator clutch between the transmission and the final drive, a control system therefor including power means for actuating the clutches and transmission, respectively, electrical means for initiating operation of said power means, and switches movable with certain of said power means for controlling the circuits for certain other of said power means whereby sequential operations with respect to the clutches and the speed changes are insured.

7. In a vehicle, in combination with an internal combustion motor, clutch and change speed gears, a control system therefor including power means for operating the clutch and transmission, an electromagnet for initiating operation of the power means for the transmission, a second electromagnet to control the condition of the circuit of said first named magnet, and controller means operable initially for energizing said second named magnet upon manipulation.

8. In a vehicle, in combination with an internal combustion motor, clutch and change speed gears, a control system therefor including power means for actuating the clutch and gears, an electromagnet for initiating operation of the power means for the gears, a second electromagnet to control the condition of the circuit of said first named magnet, controller means operable initially for energizing said second named magnet upon manipulation, and a third electromagnet energized upon completion of the manipulation of the controller to close the circuit of the power means to actuate the mechanical unit selected.

9. In a vehicle, in combination with an internal combustion motor, a master clutch, change speed gears and isolator clutch between the gears and the final drive, a control system therefor including power means for actuating the clutches and gears, respectively, electrical means for initiating operation of said power means, switches movable upon operation of the power means for the isolator clutch for controlling the circuit of said master clutch, and independent power means under the controlling of an independent circuit whereby the master clutch may be disegaged momentarily when the parts are in the stated relation.

10. In a vehicle, in combination with an internal combustion motor, a master clutch, change speed gears and isolator clutch between the gears and the final drive, a control system therefor including power means for actuating the clutches and gears, respectively, electrical means for initiating operation of said power means, switches movable upon operation of the power means for the isolator clutch for controlling the circuit of said master clutch, and a mechanical interlock movable with the isolator for maintaining the shifted gear in position.

11. In a vehicle, in combination with an internal combustion motor, a master clutch, change speed transmission, a control system therefor including power means for actuating the clutch and transmission, respectively, electrical means for initiating operation of said power means, and a switch movable upon change of speed to control the circuit of the power means for the master clutch.

12. In a vehicle, in combination with an internal combustion motor, clutch and change speed transmission, a control system therefor including power means for actuating the clutch and transmission, electromagnets for initiating operation of such power means, a manually operable controller, a remote control switch operable by manipulation of the controller to close the circuits of preselected power means and a second remote control switch whose circuit is controlled by the first named remote control switch and operable to initiate operation of said power means and means carried by certain of the elements to be moved to open the circuit of said second named remote control switch when said elements are in certain predetermined relations.

This specification signed this ninth day of July A. D. 1923.

LYMAN C. JOSEPHS, Jr.
EDWIN M. POST, Jr.